United States Patent [19]
Lee

[11] Patent Number: 5,357,092
[45] Date of Patent: Oct. 18, 1994

[54] BARCODE COMMUNICATION INTERFACE SYSTEM AND METHOD THEREFOR

[75] Inventor: Ki H. Lee, Seoul, Rep. of Korea

[73] Assignee: Goldstar Co., Ltd., Seoul, Rep. of Korea

[21] Appl. No.: 785,084

[22] Filed: Oct. 30, 1991

[30] Foreign Application Priority Data

Oct. 31, 1990 [KR] Rep. of Korea ............ 17509/1990

[51] Int. Cl.$^5$ ......................... G06K 7/10; G06F 15/21
[52] U.S. Cl. .......................... 235/462; 395/800;
364/DIG. 1; 364/237.85; 364/270; 364/259.9;
364/242.1; 364/238.3
[58] Field of Search ............ 395/800; 235/462;
364/DIG. 1 MS File, DIG. 2 MS File

[56] References Cited

U.S. PATENT DOCUMENTS

| | | | |
|---|---|---|---|
| 4,855,581 | 8/1989 | Mertel et al. | 235/462 |
| 4,873,426 | 10/1989 | Sarna et al. | 235/462 |
| 5,227,616 | 7/1993 | Lee | 235/462 |
| 5,235,167 | 8/1993 | Dvorkis et al. | 235/462 |

Primary Examiner—Thomas M. Heckler
Attorney, Agent, or Firm—Blakely, Sokoloff, Taylor & Zafman

[57] ABSTRACT

A barcode communication interface system and method capable of transmitting to a host computer barcode information received from a barcode decoder that is properly formatted and decoded without any error in an asynchronous manner. In this interface system, a microcontroller receives properly formatted barcode information data from the barcode decoder, converts the barcode information data into serial data through the asynchronous communication controller, and transmits this data to the host computer through an inverting line driver (ICL-232) and serial communication interface (RS-232C). The interface system of the present invention is compatible with various types of barcode readers, and enables the RS-232C serial communication interface to be driven by the power source for the barcode decoder.

6 Claims, 3 Drawing Sheets

FIG.1
| CHARACTER | LEFT CODE | RIGHT CODE | MODULE SUM | | |
|---|---|---|---|---|---|
| 0 | 0001101 | 1110010 | 5 | 3 | 2 |
| 1 | 0011001 | 1100110 | 4 | 4 | 3 |
| 2 | 0010011 | 1101100 | 3 | 3 | 4 |
| 3 | 0111101 | 1000010 | 5 | 5 | 2 |
| 4 | 0100011 | 1011100 | 2 | 4 | 5 |
| 5 | 0110001 | 1001110 | 3 | 5 | 4 |
| 6 | 0101111 | 1010000 | 2 | 2 | 5 |
| 7 | 0111011 | 1000100 | 4 | 4 | 3 |
| 8 | 0110111 | 1001000 | 3 | 3 | 4 |
| 9 | 0001011 | 1110100 | 4 | 2 | 3 |
FIG.2A
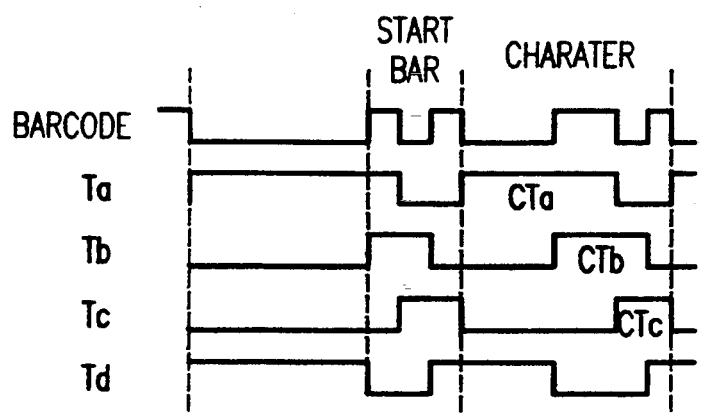
FIG.2B
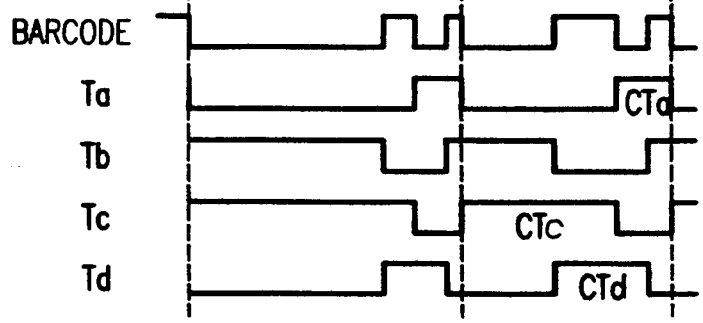

BARCODE COMMUNICATION INTERFACE SYSTEM AND METHOD THEREFOR

BACKGROUND OF THE INVENTION

1. Field of the Invention

The present invention relates to a barcode communication interface system for transmitting barcode information received from a barcode decoder to a host computer. In particular this barcode communication interface system and method transmit barcode information received from a barcode decoder in an asynchronous manner by using an asynchronous communication controller.

2. Description of the Prior Art

In general, a barcode reader comprises a barcode detector that detects a barcode and a barcode decoder that decodes the barcode.

The barcode detector scans the barcode by a laser beam and uses a photodiode to detect the reflected laser beam. The detected signal is amplified and differentiated and then converted into a digital signal through a comparator. The decoder receives this digital signal from the barcode detector, converts it into the original barcode information signal, and then transmits the signal to a host computer.

Most conventional communication interface systems are NOT compatible with both the gun-type and the fixed-type barcode reader. Since the communication interface system must be individually adapted to work with a particular type of barcode reader, the circumferential circuits for processing and transmitting the output signals of the decoder to the host computer are relatively complicated, causing the whole circuit configuration to be complicated. Moreover, in order to execute a serial communication in an asynchronous fashion by using a RS-232C, an extra power source ($\pm 10$-$\pm 12$ V) to drive the RS-232C is required, in addition to the power source (5 V) of the decoder.

SUMMARY OF THE INVENTION

Accordingly, it is an object of the present invention to provide a barcode communication interface system and a method therefor which are compatible to various types of barcode readers, and can correctly transmit the barcode information outputted from a barcode reader to a host computer by use of an asynchronous communication controller.

Another object of the present invention is to provide a barcode communication interface system which is capable of executing a serial communication interface operation between an asynchronous communication controller and a host computer by driving the RS-232C interface with the power source of the decoder.

Other objects and further scope of applicability of the present invention will become apparent from the detailed description given hereinafter. It should be understood, however, that the detailed description and specific examples, while indicating preferred embodiments of the invention, are given by way of illustrations only, since various changes and modifications within the spirit and scope of the invention will become apparent to those skilled in the art from this detailed description.

Briefly described, the present invention relates to a barcode communication interface system which includes an integrated circuit for the exclusive use of decoder (hereinafter, referred to as an IC for decoder) for generating an interrupt signal by decoding barcode-related data outputted from a barcode detector and outputting the decoded data, a microcontroller for controlling the operation of the whole system, and when an interrupt signal is generated at the IC for decoder, receiving the decoded data and outputting only proper barcode data, an asynchronous communication controller, which is under the control of the microcontroller, for converting the transmission data from the microcontroller into serial data and transmitting the converted serial data to a host computer asynchronously, and converting the reception data from the host computer into parallel data and applying the parallel data to the microcontroller, and a serial communication interface for executing an interface operation between the asynchronous communication controller and the host computer.

In addition, the serial communication interface is capable of driving normally a RS-232C serial communication interface by means of the output power of a ICL-232 inverting line driver by connecting in serial the ICL-232 inverting line driver with a RS-232C serial communication interface and applying the decoder power source (5 V) to the ICL-232 inverting line driver.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an example of a general barcode character code;

FIGS. 2A and 2B are examples of the barcode data waveform detected by a delta-distance method;

BRIEF DESCRIPTION OF THE PREFERRED EMBODIMENTS

Referring now in detail to the drawings for the purpose of illustrating preferred embodiments of the present invention, the character code of ordinary barcode is constituted such that left code and right code of character of denary number (0 to 9) include seven modules, respectively, according to the scanning directions so that it is possible to scan in any direction.

In general, bar and space which constitute a unit in the barcode are called as a "module". A barcode has more than eleven margins, of left barcode, a start bar indicating the start of barcode, left character consisting of seven modules, a center bar located at the center of barcode, right character consisting of seven modules, an end bar indicating the end of barcode, and more than seven margins of right barcode. One character is indicated with two spaces and two bars, and it is presented in the order of space, bar, space at the left of the center bar and in the order of bar, space, bar, space at the right of the center bar, thus the scanning can be executed in both the directions.

Referring to FIGS. 2A and 2B, the signals detected and outputted from the barcode detector are counted from their leading edges to leading edges, and from trailing edges to trailing edges and then the counted signals are recognized as character data.

When barcode signals, as shown in FIG. 2A, are detected and outputted at the barcode detector, a toggle signal (Ta), which is toggled at the trailing edge of the barcode signal, and a toggle signal (Tb), which is toggled at the leading edge of the barcode signal, are generated, and outputted from the pulse generator and at the same time toggle signals Tc and Td having the opposite waveforms to the toggle signals Ta and Tb, are generated and outputted. The high-potential regions of the toggle signals Ta, Tb and Tc are counted, and then the counted signals CTa, CTb and CTc are recognized as character signals.

On the other hand, when barcode signals, as shown in FIG. 2B, are detected and outputted from the barcode detector, toggle signals Ta, Tb, Tc and Td are generated and outputted, similar to the above, and the high-potential regions of the toggle signals Ta, Tc and Td are counted, and the counted signals CTa, CTc and CTd are recognized as character signals.

Accordingly, one character is constituted either by the count signals CTa, CTb and CTc or by the count signals CTa, CTc and CTd.

In this manner, when the module sum of adjacent bar and space is sought by the Delta-Distance method, it becomes the module sum as shown in FIG. 1. For example, the count signals CTa, CTb and CTc with respect to character of denary number "0" are 5, 3 and 2.

Figure 3:
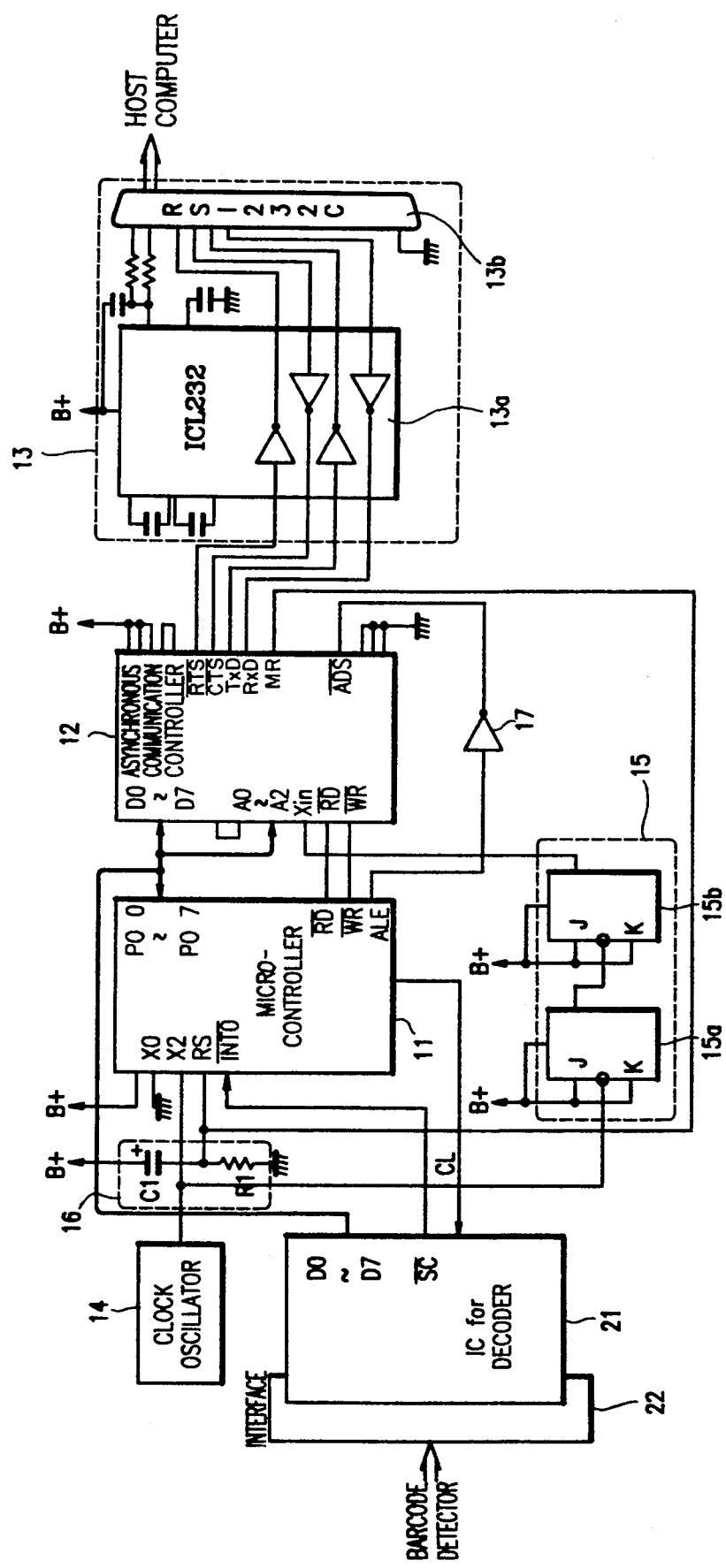
FIG. 3 is a block diagram that shows a barcode communication interface system of the present invention.

Referring now to FIG. 3, the barcode communication interface system of the present invention comprises an IC for decoder 21 for decoding barcode-related data which are detected at the barcode detector and have passed through an interface 22 into barcode information of hexadecimal number and outputting an interrupt signal $\overline{SC}$ and the decoded barcode information data, a microcontroller 11 for controlling the operation of the whole system, receiving the decoded barcode information data from the IC for decoder 21 when the interrupt signal $\overline{SC}$ is generated at the IC for decoder 21 and outputting proper data among the barcode information data, an asynchronous signal communication controller 12, which is under the control of the microcontroller 11, for converting barcode information data from the microcontroller 11 into serial data and transmitting to a host computer in an asynchronous manner, converting the data received from the host computer into parallel data and applying the converted parallel data to the microcontroller 11, a serial communication interface 13 in which ICL-232 inverting line driver 13a and RS-232C serial communication interface 13b are connected in series, for executing an interface operation between the asynchronous communication controller 12 and the host computer, a clock oscillator 14 for generating a clock signal of a predetermined frequency and applying it to the microcontroller 11 as a system clock signal, a frequency-demultiplier 15 for frequency-demultiplying the clock signal of the clock oscillator 14 by flip-flops 15a and 15b for two-frequency multiplication and supplying it to the asynchronous communication controller 12 as a clock signal, and a resetting section 16, consisting of a condenser C1 and a resistor R1, for applying a reset signal to the microcontroller 11 and the asynchronous communication controller 12 at the initial stage of power supply. In the drawing, reference numeral 17 is an inverter which is adapted to invert an address latch enable signal (ALE), which is outputted from the microcontroller 17 and applied it to the asynchronous communication controller 12.

Hereinafter, the operation and effect of the present invention will now be described in detail with reference to FIG. 4.

At the initial stage of power supply, a high potential reset signal is generated at the reset signal generating section 16 to reset the microcontroller 11 and the asynchronous communication controller 12, thereby the microcontroller 11 and the asynchronous communication controller 12 become initialized.

Meanwhile, when scanning the barcode, barcode-related data are outputted from the barcode detector for processing and recognizing the barcode and then applied to the IC for decoder 21 through the interface 22.

That is, the count signals CTa, CTb and CTc of character, the total count signals CTa+CTb of one character, a parity bit for indicating the recognizing direction that the scanning is carried out in the left or right direction, and an ambiguous character verifying bit for verifying ambiguous characters such as denary numbers "1", "2", "8", as can be seen in FIG. 1, are applied to the IC for decoder 21 through the interface 22.

The barcode-related data which are inputted to the IC for decoder 21 are stored in its internal first-in and first-out memory and decoded so as to produce hexadecimal numbers 0-F, and then an interrupt signal $\overline{SC}$ is outputted to interrupt the microcontroller 11 and also the decoded barcode information data are applied to the microcontroller 11.

Figure 4:
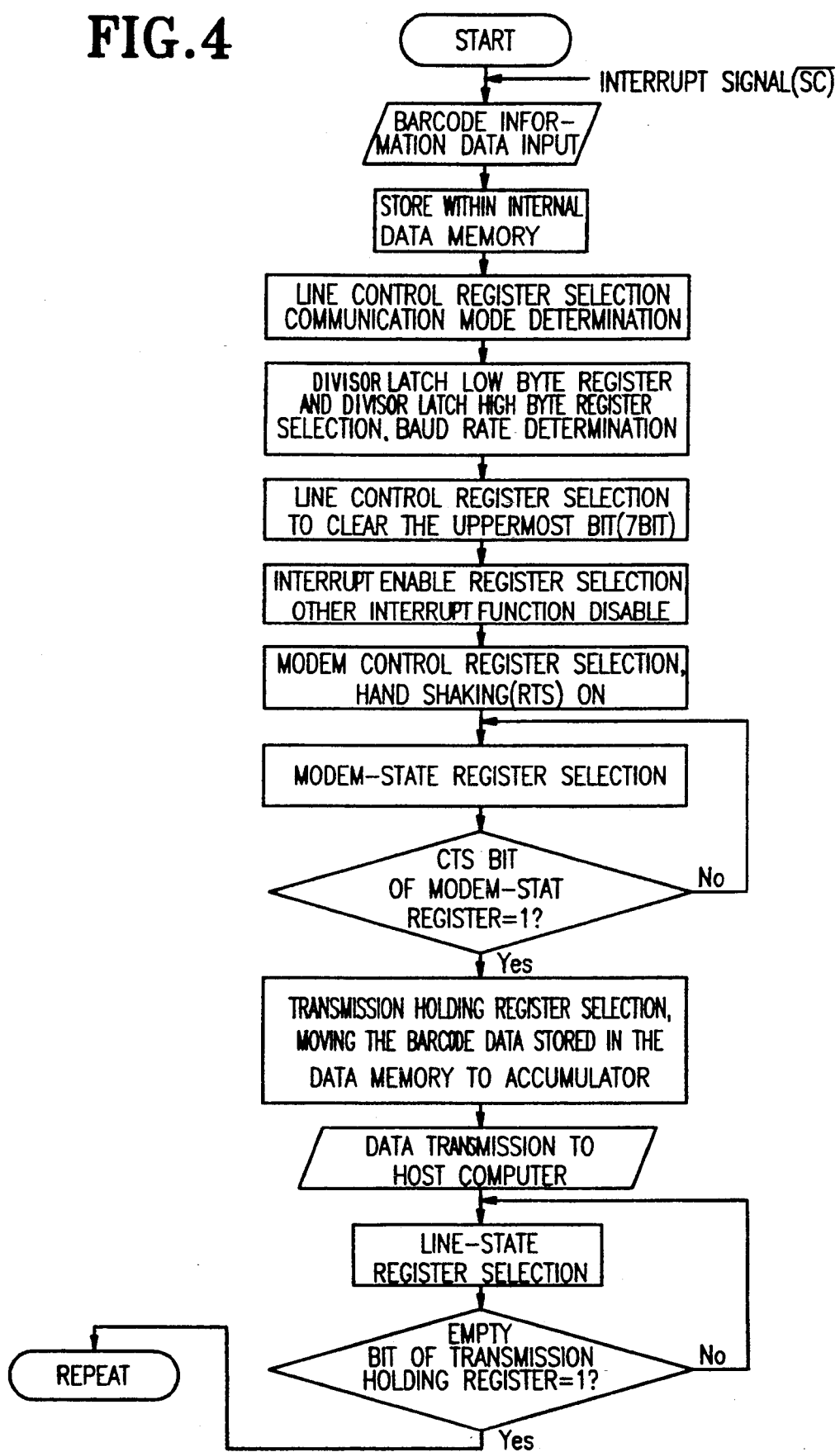
FIG. 4 is a flow-chart that shows the barcode communication interface method of the present invention.

When the microcontroller 11 is interrupted by the interrupt signal $\overline{SC}$, the barcode information data which are outputted from the IC for decoder 21 are stored in its internal memory and proper data from 0 to 9 among the barcode data are transmitted to the host computer through the procedures as shown in the flow-chart of FIG. 4.

Meanwhile, in order to transmit the barcode information data to the host computer in an asynchronous manner by the microcontroller 11, the protocols of the transmitting and receiving side have to be identical to each other. This can be obtained by initializing the asynchronous communication controller 12 by the microcontroller 11.

Furthermore, as ten registers are provided within the asynchronous communication controller 12, it is possible to access the registers by selecting the registers via address terminals A0 to A2 of the asynchronous communication controller 12 by the microcontroller 11.

Turning to FIG. 4, a line control register is selected first to determine the transmission mode, and then transmission bit numbers 5 to 8 bit per character, parity selection (odd, even, none), and stop bit numbers (1, 1½, 2) which indicate the transmission mode are determined.

Thereafter, the baud rate is determined by selecting a divisor latch low byte register and a divisor latch high byte register.

Where, the divisor can be sought by the input clock frequency (Xin) of the asynchronous communication controller 12 and the baud rate (BR), that is, Xin/(BR×16).

That is, the clock oscillation signals generated at the clock oscillator 14 are applied to the microcontroller 11 as clock signals and at the same time applied to the asynchronous communication controller 12 as clock signal after having been frequency-demultiplied by 4. Assuming the baud rate is 1200, when the frequency of the clock signal inputted to the asynchronous communication controller 12 is 2 MH, the divisor becomes about 104 according to the above equation.

Accordingly, when the denary number 104 is converted into hexadecimal number, it becomes 68 H, and thus the hexadecimal number '68H' is written down on the divisor latch low byte register, and on the divisor latch high byte register, a hexadecimal number '00H' is written down, thereby the baud rate is determined as 1200.

Thereafter, a line control register is selected to clear the most significant bit (bit 7). This is because the transmission holding register, reception buffer register and interrupt enable register within the asynchronous communication controller 12 must be selected in order to transmit and receive data between the microcontroller 11 and the asynchronous communication controller 12, and thus the selection of register is possible provided that the most significant bit (7 bit) of the line control register is cleared.

Meanwhile, there are two methods, that is, an interrupt method and a palling method for preventing an overrun error in transmitting and receiving data between the microcontroller 11 and the asynchronous communication controller 12.

When using the polling method, the empty bit (bit 5) of the transmission holding register is checked after selecting the line-state register. If the empty bit is "1", that is, in case that the barcode information data of one character which have been transmitted are transmitted to the host computer so that the barcode information data can pass through the loop only in case that the transmission holding register is empty, thereby preventing the breakdown of data.

Accordingly, when using the polling method, the interrupt enable register of the asynchronous communication controller 12 is selected so as to disable the four kinds of interrupt functions of the asynchronous communication controller 12.

On the other hand, when using the interrupt method, the interrupt enable register of the asynchronous communication controller 12 is selected, and the empty interrupt bit (1 bit) of the transmission holding register is set to "1". An interrupt is generated when every one byte is inputted in transmitting data from the microcontroller 11 to the asynchronous communication controller 12, so that one byte data can be transmitted, thereby preventing the breakdown of data.

Thereafter, in order to transmit data from the asynchronous communication controller 12 to the host computer via a serial communication interface 13, the microcontroller 11 selects the modem control register of the asynchronous communication controller 12 and transmits the data in a hand-shaking method.

At this moment, when a request-to-send bit of the modem control register is set to "1", a low level request-to-send signal $\overline{RTS}$ is outputted from the asynchronous communication controller 12 and then inverted into a high level signal by an inverter of the ICL-232 inverting line driver 13a, inverted into a low level signal by an inverter of the RS-232C serial communication interface 13b and applied to the host computer as a data-set-ready signal through the RS-232C serial communication interface 13b.

Accordingly, at this moment the host computer can recognize that the microcontroller 11 is in a data-transmission state. When the host computer is ready to receive data, a high level data reception-ready completion signal is outputted from the host computer, and the data reception-ready completion signal passes through RS-232C serial communication interface 13b and is inverted into a low level signal by an inverter of the ICL-232 inverting line driver 13a and then applied to the asynchronous communication controller 12 as a clear-to-send signal $\overline{CTS}$, thereby setting the CTS bit of the modem-state register in the asynchronous communication controller 12.

Accordingly, at this moment the microcontroller 11 selects the modem-state register of the asynchronous communication controller 12 to check whether the CTS bit is set to "1". If the CTS bit of the asynchronous communication controller 12 is set to "1", the microcontroller 11 transmits barcode information data through the asynchronous communication controller 12.

That is, the microcontroller 11 selects the transmission holding register of the asynchronous communication controller 12 and transmits the barcode information data which have been stored in its internal data memory to an accumulator.

Thereby, the barcode information data are inputted to the asynchronous communication controller 12 and stored in the transmission holding register and then converted into a serial signal, thereafter outputted through its transmission data T×D.

Meanwhile, when the barcode information data are outputted from the microcontroller 11 to the asynchronous communication controller 12, the data transmission is controlled with a MOVX command by a register indirect addressing mode, using the asynchronous communication controller 12 as an external data memory.

For example, to write down data by selecting a line control register, it will be controlled as follows:

MOV R0, #00H→address value for the selection of a line control register of the asynchronous communication controller 12;

MOV A, #00H→data value to be written down on the line control register of the asynchronous communication controller 12;

MOVX ⓐ R0, A→address and data value for making active the address latch enable signal (ALE) and recording control signal ($\overline{WR}$) the microcontroller 11, and being outputted through a port '0'.

The barcode information data which have been outputted from the transmission terminal T×D of the asynchronous transmission controller 12 are inverted at the inverter of the ICL-232 inverting line driver 13a and then applied to the host computer through the RS-232C serial communication interface 13b.

At this moment, since a power (B+) of a predetermined voltage (+5 V) is applied to the ICL-232 inverting line driver 13a, and a predetermined voltage (13 V) is produced therefrom which is compatible with the voltage level of the RS-232C serial communication interface 13b, it is possible to drive the serial communication interface by a signal drive voltage.

Furthermore, after the asynchronous communication controller 12 transmits the barcode information data as above, the empty bit of its transmission holding in register is set to "1".

Accordingly, the microcontroller 11 selects the line-state register of the asynchronous communication controller 12 and checks whether the empty bit of the transmission holding register is set to "1", and at this moment, if the empty bit is set to "1", the procedures described above are repeated, and the next barcode information data are transmitted.

As described above in detail, the present invention provides the effect that it is possible to correctly transmit the barcode information data outputted from the barcode reader to the host computer in an asynchronous transmission method, and since the serial communication interface can be driven by a single power source of the decoder, it can be used with various types of barcode readers compatibly.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A barcode transmission interface system, comprising:
   a clock oscillator for supplying a system clock signal to a microcontroller;
   frequency-demultiplying means for frequency-demultiplying the system clock signal of said clock oscillator and supplying the frequency demultiplied system clock signal to a communication controller;
   decoding means for decoding barcode data and outputting the decoded barcode data together with an interrupt signal;
   the microcontroller for receiving decoded barcode data from said decoding means in response to the interrupt signal which is outputted from said decoding means, said microcontroller outputting to the communication controller only barcode data which is correctly decoded without error;
   the communication controller for transmitting to a host computer barcode information data outputted from said microcontroller and transmitting data from said host computer to the microcontroller;
   interface means for sending and receiving information between said communication controller and the host computer; and
   reset means for applying a reset signal to the microcontroller and the communication controller.

2. The system of claim 1, wherein said interface means includes an inverting line drive and a serial communication interface.

3. The system of claim 1 or claim 2, wherein said interface means is driven by a single power source.

4. A barcode communication interface method, comprising the steps of;
   storing to an internal memory of a microcontroller barcode information data and interrupt signals;
   determining a communication mode by selecting with the microcontroller a line control register of an asynchronous communication controller;
   determining a baud rate by selecting with the microcontroller a divisor latch register of the asynchronous communication controller;
   clearing a most significant bit by selecting with the microcontroller the line control register of the asynchronous communication controller;
   disabling all interrupt functions by selecting with the microcontroller an interrupt enable register of the asynchronous communication controller;
   outputting a hand shaking signal to a host computer by setting with the microcontroller the hand shaking signal bit of a modem control register of the asynchronous communication controller;
   checking whether a clear to send bit of a modem status register of the asynchronous communication controller is set;
   transmitting the stored barcode information data to an accumulator by selecting with the microcontroller a transmitter holding register of the asynchronous communication controller and transmitting the data to the host computer; and
   executing repeatedly all the above steps when a transmitter holding register empty bit of a line status register of the asynchronous communication controller is set.

5. The method of claim 4, wherein the selection of the transmission holding register is determined by transmitted bit number per character, parity selection, and stop bit number.

6. The method of claim 4, wherein said divisor latch register includes a divisor latch low byte register and a divisor latch high byte register.

* * * * *

UNITED STATES PATENT AND TRADEMARK OFFICE
CERTIFICATE OF CORRECTION

PATENT NO. : 5,357,092
DATED : October 18, 1994
INVENTOR(S) : Ki H. Lee

It is certified that error appears in the above-indentified patent and that said Letters Patent is hereby corrected as shown below:

In column 3 at line 23 change "in" to --In--.

Signed and Sealed this

Eighth Day of August, 1995

Attest:

BRUCE LEHMAN

Attesting Officer          Commissioner of Patents and Trademarks